L. B. KENNEY.
Pole for Agricultural Implements.
No. 205,397.      Patented June 25, 1878.
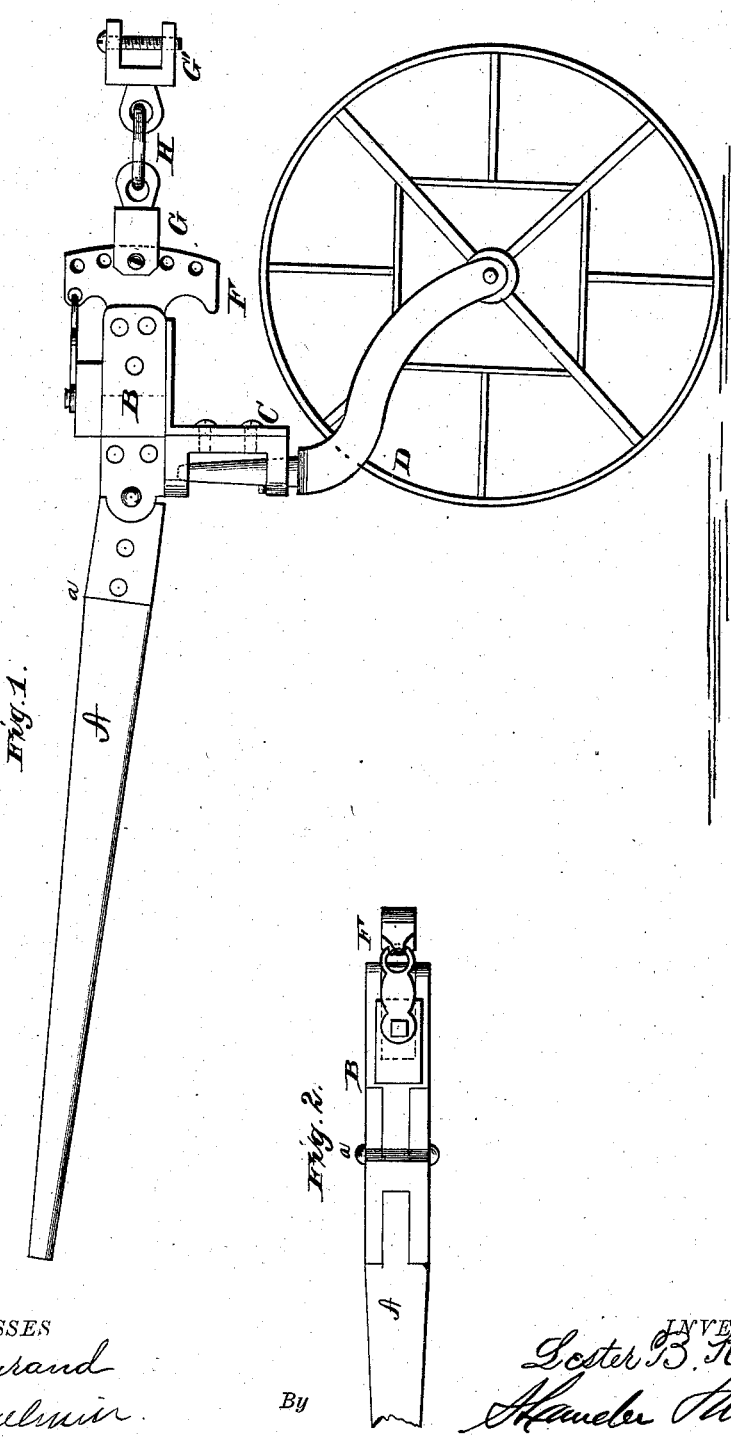

UNITED STATES PATENT OFFICE.

LESTER B. KENNEY, OF CHARLOTTE, MICHIGAN.

IMPROVEMENT IN POLES FOR AGRICULTURAL IMPLEMENTS.

Specification forming part of Letters Patent No. 205,397, dated June 25, 1878; application filed April 15, 1878.

*To all whom it may concern:*

Be it known that I, LESTER B. KENNEY, of Charlotte, in the county of Eaton, and in the State of Michigan, have invented certain new and useful Improvements in Poles for Agricultural Implements; and do hereby declare that the following is a full, clear, and exact description thereof, reference being had to the accompanying drawings, and to the letters of reference marked thereon, making a part of this specification.

The nature of my invention consists in the construction and arrangement of a pole or tongue for a plow, drag, or cultivator, as will be hereinafter more fully set forth.

In order to enable others skilled in the art to which my invention appertains to make and use the same, I will now proceed to describe its construction and operation, referring to the annexed drawing, in which—

Figure 1 is a side elevation of my invention. Fig. 2 is a plan view of a portion of the pole or tongue.

The pole or tongue is made in two parts, A and B, jointed together, as shown at $a$, in such a manner that the main or front part A will have a limited up-and-down movement. The adjacent ends of the two parts are suitably ironed, as shown, and to the under side of the rear part B, immediately in rear of the joint, is secured a frame, C, in which is placed a caster-wheel, D, as shown. The extreme rear end of the pole is provided with a perforated clevis, F, secured stationary therein, and to the same is adjustably connected a clip, G. A similar clip, G', is to be connected to the front end of the plow-beam or other implement, and the two clips are connected by a ring or link, H.

It will thus be seen that I provide the pole with a joint in front of the plow-wheel and one to three joints in the rear of the wheel. The joints in the rear will cause the plow to plow middling rough ground without raising the point of the plow, and then, when the ground is very uneven—for instance, corn-stubble—the joint in the pole will break over at a certain point, so as not to raise the point of the plow with the joints in front and rear of the wheel. I can plow uneven ground level on the bottom of the furrow.

Another advantage is that the horses cannot step over the traces as easily as they could without a pole.

The caster-wheel D rolls in any direction without dragging.

Having thus fully described my invention, what I claim as new, and desire to secure by Letters Patent, is—

The combination of the pole A B, made in two parts, jointed together at $a$, the frame C, caster-wheel D, clevis F, clips G G', and link H, all constructed substantially as and for the purposes herein set forth.

In testimony that I claim the foregoing I have hereunto set my hand this 30th day of March, 1878.

LESTER B. KENNEY.

Witnesses:
T. D. GREEN,
SETH KETCHAM.